DEFLECTION CONTROL DEVICE FOR CATHODE RAY TUBES

Filed Jan. 23, 1963

INVENTOR:
SVEND E. HAVN,
BY Frank J. Thompson
HIS ATTORNEY.

3,247,426

DEFLECTION CONTROL DEVICE FOR CATHODE RAY TUBES

Svend E. Havn, Liverpool, N.Y., assignor to General Electric Company, a corporation of New York Filed Jan. 23, 1963, Ser. No. 253,320
3 Claims. (Cl. 317—200)

The present invention relates to a deflection control device for controlling the magnitude of deflection of the beam of a cathode ray tube.

Present deflection units for cathode ray tubes employ electronic circuitry in most instances to provide an adjustment of the maximum angular horizontal or vertical deflection of the beam. Such units generally operate by controlling the magnitude of the energizing current supplied to the windings of the electromagnetic deflection yoke which is positioned about the neck of the cathode ray tube. The electronic circuitry required in this prior art arrangement is relatively complex and involves an undesirable production expense. This is of particular concern in cathode ray tube systems manufactured at mass production levels such as for use in the standard home television receiver.

Accordingly, it is an object of the present invention to provide an improved deflection magnitude control of simplified and inexpensive construction for controlling the magnitude of deflection of the beam of a cathode ray tube.

Another object of this invention is to provide in a deflection yoke an improved means for controlling the magnitude of deflection of a beam in a first direction without interfering with the magnitude of deflection of the beam in a second direction which is perpendicular to the first direction.

It is a further object of this invention to provide a simplified mechanical control of inexpensive construction which permits ease of adjustment for controlling the magnitude of deflection of the beam of a cathode ray tube.

Still another object of this invention is to provide in a television receiver having a cathode ray tube deflection system including a yoke comprising a toroidally wound deflection winding for generating a vertical deflection field and a saddle shaped deflection winding for generating a horizontal deflection field, an improved means for varying the magnitude of the horizontal deflection field leaving substantially undisturbed the magnitude of the vertical deflection field.

Further objects and advantages of this invention will become apparent as the following description proceeds and the features of novelty which characterize this invention will be pointed out with particularity in the claims annexed to and forming part of this specification.

In carrying out this invention in one form thereof, an air gap is provided in the core of a magnetic deflection yoke which is properly positioned on the neck of a cathode ray tube. A slug of ferromagnetic material, such as ferrite, is adjustably positioned within the air gap, thereby controlling the effective width of the air gap. This variation in air gap width varies the overall reluctance of the core to a flux path established therein by a deflection coil. Inasmuch as the flux controls the deflection of the beam of the cathode ray tube, the variation in the strength of the flux thereby achieved permits a control of the magnitude of deflection of the beam of the cathode ray tube and thus the width or height of the reproduced image on the screen of the cathode ray tube.

For a better understanding of this invention, reference may be had to the following detailed description and drawings of one illustrative embodiment thereof in which.

Figures 1, 2, 3, 4, 5:
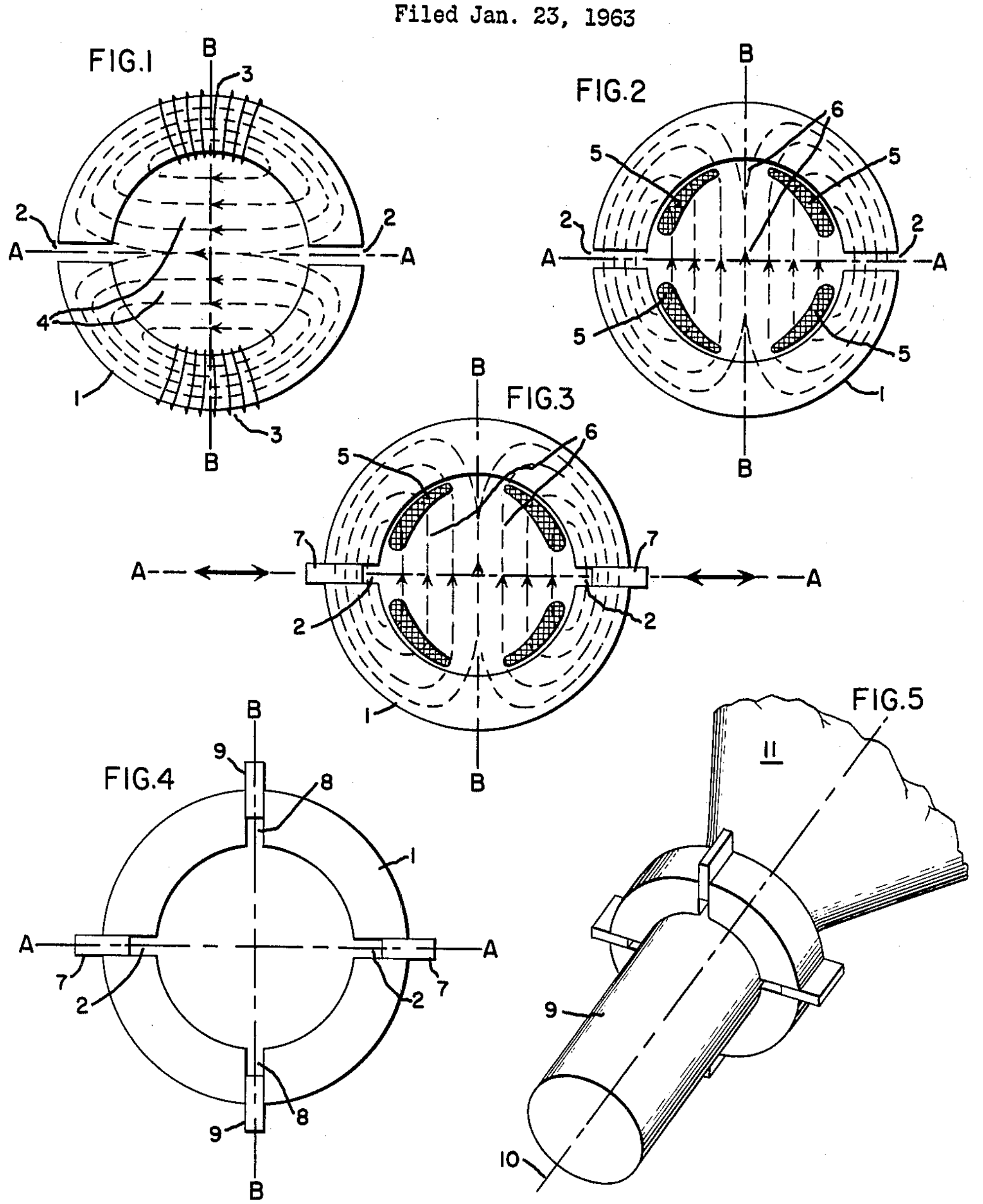
FIGURE 1 is a schematic view of a magnetic core for a deflection yoke having an air gap according to the invention and showing a toroidal winding positioned thereon and the path of the magnetic flux produced thereby.
FIGURE 2 is a schematic view of the same core as shown in FIGURE 1, illustrating a saddle deflection winding and the path of the magnetic flux produced thereby.
FIGURE 3 is a schematic view of the same core as shown in FIGURE 2, illustrating the ferrite slug disposed in the air gap to effect deflection magnitude control, according to the invention, in one direction.
FIGURE 4 is a schematic view of the same core as shown in the above figures illustrating an adaptation of the core according to the invention to effect deflection magnitude control in two orthogonal directions.
FIGURE 5 is a schematic view of the core illustratively positioned about the neck of a cathode ray tube.

In FIGURE 1, the magnetic core 1 is schematically illustrated as being of an annular cross section in a plane perpendicular to the axis of the core, along which axis passes the beam of a cathode ray tube. The air gaps 2 are introduced in the core symmetrically about the horizontal symmetry plane A—A which lies along the axis of the core, thereby defining upper and lower segments of the core. Toroidal winding 3 is shown coiled about the core on central portions of both the upper and the lower segments of the core 1. The flux lines 4 produced by the toroidal winding 3 to effect vertical deflection of the cathode beam are seen to form closed paths, passing through arcs lying symmetrically within each segment of the core and continuing in generally horizontal paths, parallel to the plane A—A, through the circular space defined by and lying within the annular core 1. The external magnetic flux lines produced by winding 3 have been omitted in this figure for clarity of presentation.

As illustrated in FIGURE 1, none, or at best only a negligible amount, of the flux lines 4 passes through the air gaps 2. Thus, the air gaps will have no, or only a negligible effect, on the reluctance of the core 1 to the flux lines 4.

The core 1 is shown in FIGURE 2 in the same orientation as in FIGURE 1, the air gaps 2 remaining symmetrically disposed about the plane A—A. Saddle winding 5 produces flux lines 6 to provide for horizontal deflection of a cathode ray beam. A variation in the strength of these flux lines 6 controls the magnitude of angular deflection of the beam with a concomitant control of the width of the image produced on the cathode ray tube screen by the beam. Since each of the flux lines 6 must cross an air gap to complete its closed path, it is readily apparent from the view of FIGURE 2 that the air gaps will have a substantial effect on the reluctance of the core to the flux path of the flux lines 6.

In accordance with this invention, the strength or density of the flux lines 6 is controlled by changing the reluctance of the core 1, this being achieved by varying the effective width of each air gap by adjustably inserting a slug of ferromagnetic material, such as ferrite, into each of the air gaps 2. Slugs 7, as shown in FIGURE 3, are designed to fit closely within the air gaps and to contact the opposed faces of the core which define each air gap. The slugs provide a continuous path of ferromagnetic material and thus reduce the reluctance of the core to the flux lines passing therethrough. The slugs 7 are inserted into the air gaps by an amount sufficient to achieve the desired magnitude of deflection of the beam. Thus, with the effective width of each air gap is decreased in accordance with the increased amount by which the slug is inserted into the air gap.

As noted in the discussion of FIGURE 1, the air gaps 2 have no effect, or only a negligible effect, on the flux lines 4. Similarly, it is apparent from FIGURE 2 that air gaps may be provided in the core 1 symmetrically disposed about plane B—B, which have no effect, or only a negligible effect, on the flux lines 6. Such an alternative embodiment is shown in FIGURE 4, which is similar to FIGURES 1 and 2 but with the windings and flux lines removed. In FIGURE 4, there are provided in the core 1 a second pair of air gaps 8 which are symmetrically disposed about the vertical symmetry plane B—B. Ferromagnetic slugs 9, of the same variety as the slugs 7, may be inserted to a desired extent into the air gaps 8 to effect control of the magnitude of the vertical deflection of the cathode ray beam in the same manner as achieved by the movable slugs 7. It is noted that a slight separation of the toroidal windings will be required to provide for the air gaps 8 and the slugs 9.

In FIGURE 5, the core structure of FIGURE 4 embodying the invention is shown positioned about the elongated cylindrical neck 9 and axially aligned with the axis 10 of cathode ray tube 11, the screen portion and other elements of which are not shown in the drawing. The perspective view of FIGURE 5 does not show the windings on the core 1 and is intended solely as a means of visualizing the use of the core for the deflection of the beam of the cathode ray tube.

Figure 6:
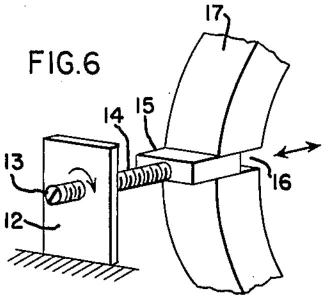
FIGURE 6 is a schematic view of a portion of the magnetic deflection core of the above figures showing, in an illustrative embodiment, a means for controlling the displacement of the ferrite slug within the air gap of the core.

Although any suitable means may be employed for adjusting the position of the slug within the air gap, FIGURE 6 provides one illustrative embodiment. In FIGURE 6, mounting plate 12 has secured therein a rotatable drive 13 which effects a longitudinal extension or retraction of member 14. Member 14 is suitably joined to ferromagnetic slug 15 to provide for its insertion or withdrawal from within the air gap 16 of the core 17, only a small portion of which is shown. It is apparent that such an adjustment means may be extended to a remote position, such as to the back panel of a consumer-type television set, for convenience and ease of adjustment of the picture dimensions. The structure of FIGURE 6, of course, may be repeated for each slug employed in the device. Thus, each slug may be independently adjusted to control the magnitude of deflection of the beam in each quadrant as defined by the air gaps of FIGURE 4, thereby compensating for any irregularities or dissymmetries in the core, the windings, or any other portions of the system. Alternatively, suitable mechanical linkage may be provided to permit simultaneous positioning of each of the pair of slugs to thereby provide one control for the magnitude of vertical deflection and one control for the magnitude of horizontal deflection.

Figure 7:
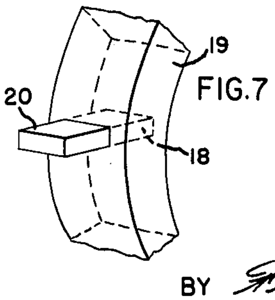
FIGURE 7 is a schematic view of a portion of the magnetic core as shown in the above figures illustrating an alternative embodiment of the air gap and ferrite slug.

FIGURE 7 illustrates an alternative embodiment of the air gap and slug arrangement. In this embodiment, the air gap 18 does not completely segmentalize the magnetic core but rather extends across only a substantial portion thereof, and provides, in effect, an aperture or a recess in the wall of the core. The structure comprehended here is such that the core 19 may be molded as a solid unit, thereby providing greater ease in final assemblage of the completed deflection yoke and closer tolerances for fitting the slug 20 within the air gap 18. It is noted that the portion of the core 19 bordering the air gap 18 must be of minimal thickness so as not to substantially reduce the control provided by the slug 20. Alternatively, a rim of non-ferromagnetic material might be molded with the core to provide the bordering portion about the air gap. Inasmuch as the air gap may assume various configurations, any of which would satisfy the operative requirements of this invention, the term "air gap" as used in this specification is intended to include any configuration, including an aperture, a recess, or a complete cut through the core, which would permit the insertion therein of a ferromagnetic slug to vary the reluctance of the core.

In summary, this invention provides a relatively inexpensive device for controlling the magnitude of deflection of the beam of a cathode ray tube. Further, this mechanical control offers advantages seldom provided by electrical controls in that each slug may be operated independently to vary the reluctance of the magnetic core in selected portions thereof and thus provide compensation for dissymmetries in the flux field, which may occur by any of a number of causes, to thus provide a well-proportioned display, in addition to a properly dimensioned display on the screen of a cathode ray tube.

Although the invention has been described with reference to specific embodiments, the invention is not limited to these embodiments and modifications will be obvious to those skilled in the art. It is thus intended that the invention is not limited to the particular details shown and described which may be varied without departing from the spirit and scope of the invention and the appended claims.

What is claimed as new and desired by Letters Patent of the United States is:

1. A deflection unit for the beam of a cathode ray tube comprising:
- (a) a ferromagnetic core of substantially annular cross section coaxially positioned about the neck of said tube,
- (b) diametrically disposed air gaps in said core,
- (c) a coil operatively associated with said core to produce magnetic flux passing through each of said air gaps to effect deflection of said beam,
- (d) a ferromagnetic slug adjustably received within each of said air gaps to vary the reluctance of said core to said flux,
- (e) whereby movement of said slugs with said air gaps controls the magnitude of deflection of said beam.

2. A deflection unit for the beam of a cathode ray tube comprising:
- (a) a ferromagnetic core of substantially annular cross section coaxially positioned about the neck of said tube,
- (b) a first pair of air gaps in said core disposed along a horizontal plane through the axis of said core,
- (c) a second pair of air gaps in said core disposed along a vertical plane through the axis of said core,
- (d) a first coil operatively associated with said core to produce a first field of magnetic flux passing through each of said first pair of air gaps to effect deffection of said beam in said vertical plane,
- (e) a second coil operatively associated with said core to produce a second field of magnetic flux passing through each of said second pair of air gaps to effect deflection of said beam in said horizontal plane,
- (f) a ferromagnetic slug adjustably received within each of said first pair of air gaps to vary the reluctance of said core to said first field of flux to thereby control the magnitude of deflection of said beam in said vertical plane,
- (g) a ferromagnetic slug adjustably received within each of said second pair of air gaps to vary the reluctance of said core to said second field of flux to thereby control the magnitude of deflection of said beam in said horizontal plane.

3. A deflection unit for the beam of a cathode ray tube comprising:

(a) a ferromagnetic core of substantially annular cross section coaxially positioned about the neck of said tube, (b) diametrically disposed air gaps in said core, (c) a coil operatively associated with said core to produce magnetic flux passing through each of said air gaps to effect deflection of said beam, (d) a ferromagnetic slug adapted to be received within each of said air gaps, (e) means to adjustably position each of said slugs within said air gaps to very the reluctance of said said core to said flux to thereby control the magnitude of deflection of said beam.

References Cited by the Examiner

UNITED STATES PATENTS

| | | | |
|---|---|---|---|
| 2,717,323 | 9/1955 | Clay | 313—84 |
| 2,729,759 | 1/1956 | Kratz et al. | 317—200 |
| 2,883,569 | 4/1959 | Kaiser et al. | 317—200 |
| 3,106,658 | 10/1963 | Chandler et al. | 317—200 |

FOREIGN PATENTS

| | | |
|---|---|---|
| 125,575 | 8/1925 | Germany. |
| 855,018 | 11/1960 | Great Britain. |

ROBERT K. SCHAEFER, *Acting Primary Examiner.*

JOHN F. BURNS, LARAMIE E. ASKIN, *Examiners.*